(12) United States Patent
Wang et al.

(10) Patent No.: US 8,250,186 B2
(45) Date of Patent: Aug. 21, 2012

(54) METHOD AND SYSTEM OF SMART DETECTION AND RECOVERY

(75) Inventors: Guo Yuan Wang, Taipei (TW); Jiann Jyh Chen, Taipei (TW)

(73) Assignee: Cameo Communications Inc. (TW)

(*) Notice: Subject to any disclaimer, the term of this patent is extended or adjusted under 35 U.S.C. 154(b) by 391 days.

(21) Appl. No.: 12/657,121

(22) Filed: Jan. 14, 2010

(65) Prior Publication Data

US 2011/0087762 A1    Apr. 14, 2011

(30) Foreign Application Priority Data

Oct. 8, 2009   (TW) .............................. 98134060 A (51) Int. Cl.
    *G06F 15/177* (2006.01)
(52) U.S. Cl. ........ 709/221; 709/219; 709/223; 709/224; 370/352; 370/391; 370/354
(58) Field of Classification Search .......... 709/223–224, 709/219, 221; 370/352, 391, 354
    See application file for complete search history.

(56) References Cited

U.S. PATENT DOCUMENTS

| | | | |
|---|---|---|---|
| 7,249,183 B1* | 7/2007 | Subbiah | 709/227 |
| 2002/0032761 A1* | 3/2002 | Aoyagi et al. | 709/223 |
| 2005/0259654 A1* | 11/2005 | Faulk | 370/392 |
| 2006/0174342 A1* | 8/2006 | Zaheer et al. | 726/23 |

* cited by examiner

*Primary Examiner* — Wing Chan
*Assistant Examiner* — Hitesh Patel (57) ABSTRACT

A smart detection and recovery method is implemented in a terminal for detecting statuses of a host. The method comprises steps of: receiving a datagram; determining if the datagram complies with a predetermined format? If "YES" then proceed; determining if a MAC address contained in the datagram is the same with a currently used MAC address pre-stored in the terminal? If "YES" then proceed; determining if an IP address contained in the datagram is the same with a currently used IP address pre-stored in the terminal? If "NO" then re-connect or guide the terminal to the IP address contained in the datagram, if "YES" then handle the datagram by normal operations. Therefore, changes of the IP address of the host can be detected as early as possible, such that the terminal can be re-connected or guided to the host and services of the host can recovered as soon as possible.

20 Claims, 8 Drawing Sheets

Standard ARP data:

| MAC header | ARP header | Data |
|---|---|---|

Fields of the MAC header:

| Target MAC address | Source MAC address | Type |
|---|---|---|

Fields of the ARP header:

| Type of hardware | Type of protocol | | | | |
|---|---|---|---|---|---|
| Size of hardware | Size of communication protocol | Opcode | | | |
| | | Hardware Address of Sender | Protocol Address of Sender | Hardware Address of Target | Protocol Address of Target |

Fig. 6

Example of ARP requesting data : 60 bytes
MAC header : 14 bytes

| ff ff ff ff ff ff | 00 18 e7 74 20 94 | 08 06 |
|---|---|---|

ARP header : 28 bytes

| 00 01 | 08 00 |
|---|---|
| 06 | 04 | 00 01 |
| 00 18 e7 74 20 94 |
| ac 15 61 c5 |
| 00 00 00 00 00 00 |
| ac 15 60 fe |

Data : 18 bytes

| 00 00 00 00 00 00 00 00 00 00 00 00 00 00 00 00 00 00 |
|---|

METHOD AND SYSTEM OF SMART DETECTION AND RECOVERY

BACKGROUND OF INVENTION

1. Field of the Invention

The present invention relates to a method and system of smart detection and recovery, and more particularly, to a method and system of smart detection and recovery that are applied in a network environment to detect whether a monitored device has changed its original IP address at an early time so that reconnection can be made to recover services as early as possible.

2. Description of the Prior Art

Deployment of networks, no matter in enterprises, organizations, campuses or in common houses, has become very developed. Accordingly, numerous devices for providing services are disposed in these network environments. For purpose of convenience, most of the networks adopt the Dynamic Host Configuration Protocol (DHCP) for configuration of network addresses. However, when network addresses used by these devices for providing services experience a change due to some reasons, interruption of the services will occur.

As the number of conventional network addresses has become insufficient for use, network address translation (NAT) is often adopted in many environments to increase the number of devices allowed to use. When such devices deployed in the NAT network environment desire to provide a service, a port forwarding operation becomes inevitable. However, once such a device changes its original network address, a trouble will be caused to both the service providers and the service users.

To solve this problem, many different methods have been proposed. As one of these methods, Dynamic Domain Name Service (Dynamic DNS) may be suitable for some environments, but when operating in network environments adopting NAT, it would become almost useless.

Figure 1:
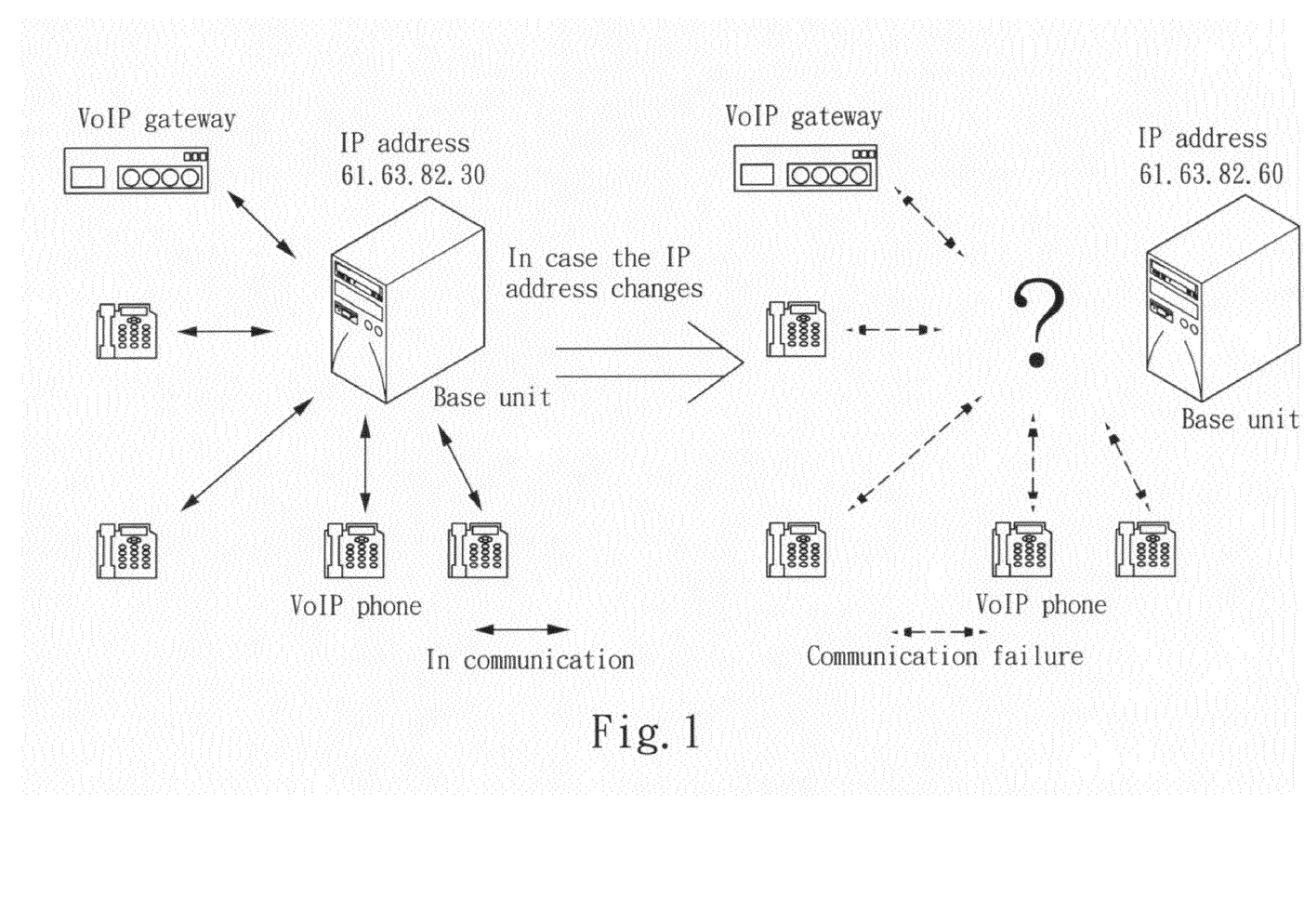
FIG. 1 is a schematic diagram of a typical conventional VoIP communication environment.

Taking a VoIP (Voice over IP) communication environment shown in FIG. 1 as an example, the Response Point plan has been proposed by Microsoft® as a VoIP application in order to ease the difficulty in setting VoIP. The purpose is to, by means of a humanistic design and by using an automatic server, a VoIP phone and a VoIP gateway together, eliminate the trouble caused by changing settings of conventional telephone switch networks, thereby reducing cost of deploying a telephone network in an enterprise environment and taking full advantage of the cost-saving nature of VoIP communication. Moreover, because the Response Point telephone network is declared to be easy to deploy, all devices used in such a network adopt DHCP for self-setting.

In the Response Point telephone network, there exists a base unit that plays the role of an SIP (Session Initiation Protocol) server. Apart from playing the role of an SIP server, the base unit also has to serve the functions of voice recognition, voice mail and some of service functions specific to Response Point. Telephones and gateways intended to use the VoIP services all have to register with this base unit in order to exchange messages through SIP. Although it seems to be reasonable, such a network architecture has a potential risk because once an error or crash occurs to the base unit, it would mean failure of the whole telephone network, which would impose a direct impact on the enterprise. For this problem, enabling the base unit to monitor itself by means of a certain software program (e.g., WatchDog®) may be a good solution. Unfortunately, once the base unit is rebooted after occurrence of an error, a change of the network address may make the telephones and gateways in the network unaware of the change in address of the base unit, causing failure to utilize the telephone functions. Hence, improvement still has to be made.

Figure 2:
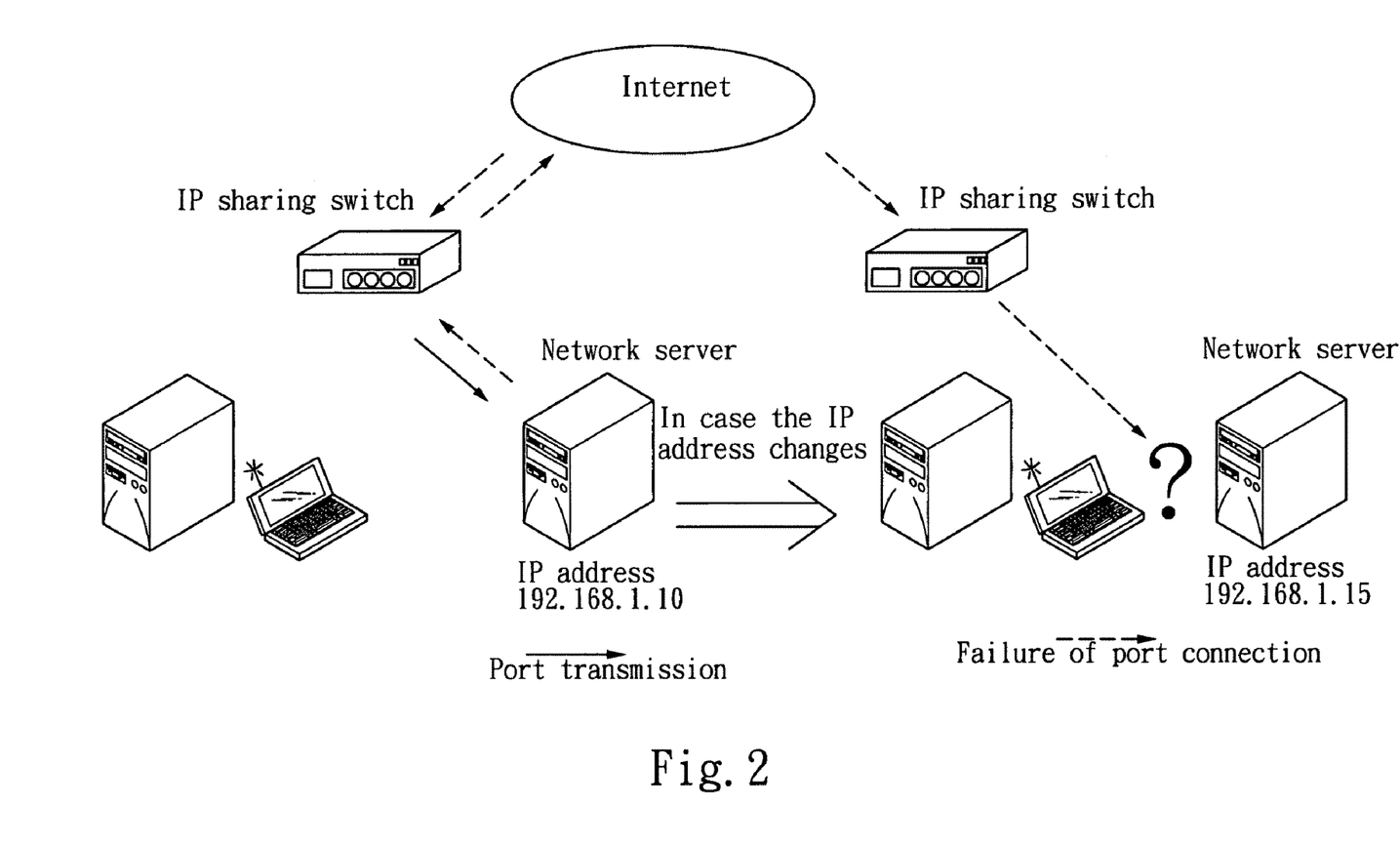
FIG. 2 is a schematic diagram of a typical conventional home IP sharing communication environment.

Taking a home IP sharing communication environment shown in FIG. 2 as an example, as the number of conventional network addresses has become not enough for use, home users who require connecting several computers to the network at the same time mostly purchase an IP sharing switch to achieve this goal. Most of the commercially available IP sharing switches for home use integrate diversified functions together, e.g., functions of an AP (Access Point), Dynamic DNS, access restrictions, and the like. When a user desires to provide a service in such a network environment, the Dynamic DNS provided by the IP sharing switch allows the user to not worry about the problem of whether the network address is fixed, and what left to be done is configuration of the service devices within the IP sharing network.

Usually, IP sharing provides the function of Port Forwarding so that the user can access a designated device within the internal network via a specific port that connects with an external address. However, this also causes the problem that a device for providing services might fail to be connected normally due to change of the network address. Accordingly, improvement still has to be made thereon.

SUMMARY OF INVENTION

The primary objective of present invention is to provide a method and system of smart detection and recovery. The method and system of smart detection and recovery can not only automatically detect for a change in network address of a specific device, but also allow an apparatus receiving the service to be automatically reconnected or redirected when a change in network address is detected so that duration of service interruption is shortened to the greatest extent, thereby obviating the trouble in terms of connection and possible consequent loss caused by failure of proper connection.

In order to achieve aforementioned objective, the present invention discloses a method of smart detection and recovery. The method is implemented in a terminal in order to detect a status of a host, wherein the terminal retrieves from the host in advance an IP address currently used and an MAC address currently used by the host. The method comprises the following steps executed by the terminal:

(a) receiving a datagram which at least contains the following information: datagram format information, MAC address information and IP address information;

(b) determining whether the datagram format information complies with a predetermined datagram format, and if "yes", then executing step (c), and otherwise, executing step (g);

(c) determining whether the MAC address information included in the datagram is identical to the MAC address currently used, and if "yes", then executing step (d), and otherwise, executing step (g);

(d) determining whether the IP address included in the datagram is identical to the IP address currently used, and if "yes", then executing step (e), and otherwise, executing step (f);

(e) executing an address altering procedure in which the IP address included in the datagram is used as a new address and reconnection or redirection to the new address is made;

(f) processing the received datagram through a normal procedure and returning to the step (a); and (g) omitting the datagram and returning to the step (a).

In a preferred embodiment, the datagram format information at least includes a size of the datagram and an MAC header, and the step (b) further comprises the following steps of:

(b1) determining whether the size of the datagram is consistent with a predetermined size, and if "yes", then executing step (b2), and otherwise, executing the step (g); and (b2) determining whether the MAC header of the datagram complies with a predetermined format, and if "yes", then executing the next step, and otherwise, executing the step (g).

In a preferred embodiment, the MAC header at least further includes a Type field, and the method further comprises the following steps after the step (b2):

(b3) determining whether the Type field included in the MAC header complies with a predetermined Type format, and if "yes", then executing the step (c), and otherwise, executing the step (g).

In a preferred embodiment, the datagram format information further comprises an ARP header, and the step (b3) further comprises the following determination operation: determining whether an Opcode field included in the ARP header of the datagram complies with a predetermined Opcode format, and if "yes", then executing the step (c), and otherwise, executing he step (g).

In a preferred embodiment, the method further comprises the following steps after the step (b2):

(b2a) determining whether a Next Header field included in an IP header of the datagram complies with a predetermined header format, and if "yes", then executing step (b2b), and otherwise, executing the step (g); and (b2b) determining whether a Type field included in an ICMPv6 header of the datagram complies with a predetermined ICMPv6 format, and "yes", then executing the step (c), and otherwise, executing the step (g).

In a preferred embodiment, the terminal is a VoIP phone, a VoIP gateway, a network IP router, an IP sharing switch, a wireless network base station, a computer or a handheld network device.

In a preferred embodiment, the host is a VoIP base unit, a web server or a computer.

In a preferred embodiment, the IP address currently used and the MAC address currently used that are retrieved in advance by the terminal are stored into a memory in form of a look-up table (LUT).

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF PREFERRED EMBODIMENTS

Figure 3:
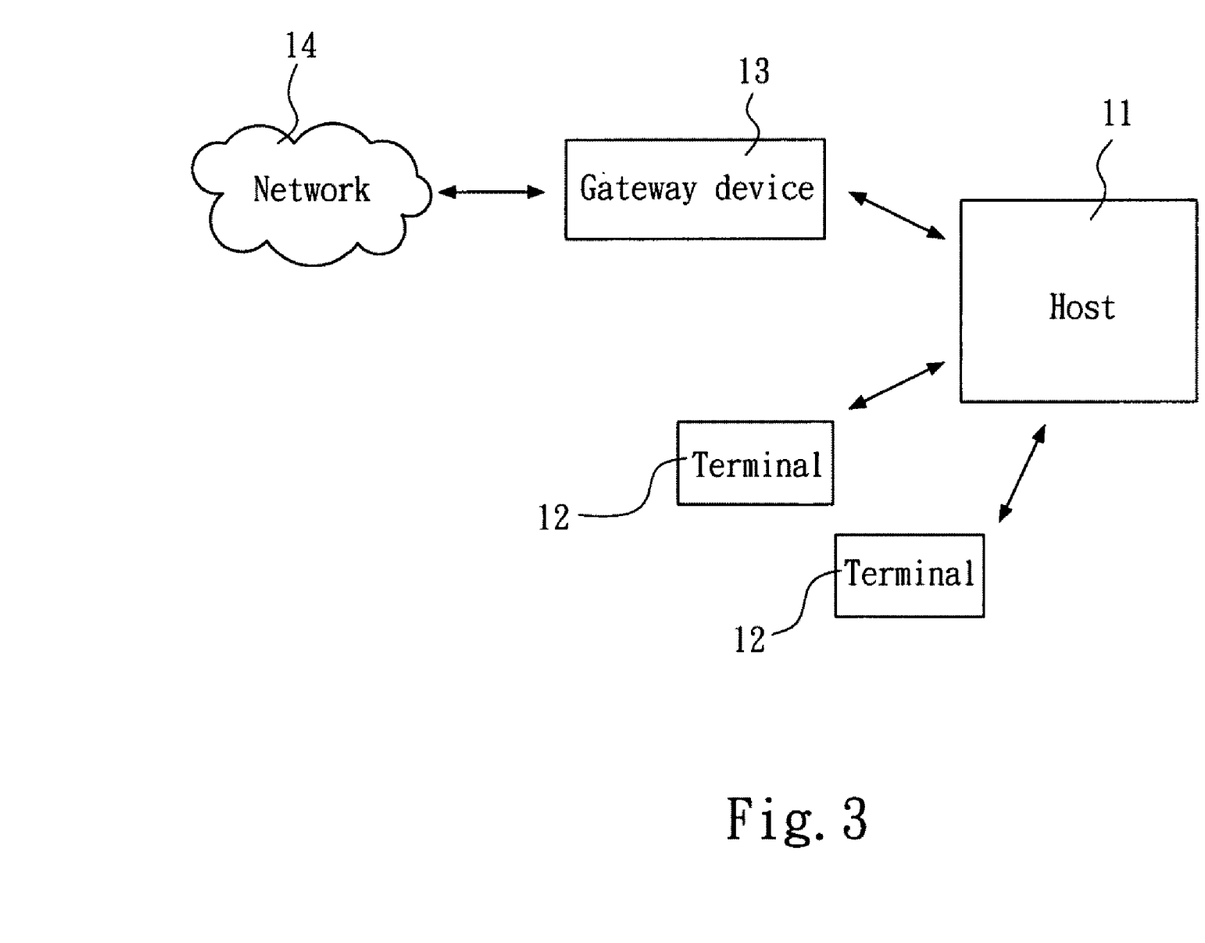
FIG. 3 is a schematic diagram of a network architecture of a system of smart detection and recovery according to the present invention.

FIG. 3 shows a schematic diagram of a network architecture of a system of smart detection and recovery according to the present invention. The system of smart detection and recovery according to the present invention is implemented in a network environment, which comprises at least a host 11, a plurality of terminals 12 and at least a gateway device 13. The host 11 is connected via the gateway device 13 to an external network 14, for example but not limited to, the Internet, a telephone communication network or the like. The terminals 12 communicate with the host 12 through a wired or wireless network connection and receive services provided by the host 11. For example, taking a VoIP communication environment as an example, the host 11 may be a base unit, each of the terminals 12 may be a VoIP phone, a VoIP gateway, a computer with the VoIP phone functionality, a handheld network device or the like, the gateway device 13 may be a VoIP gateway, and the network 14 connected may be a telephone communication network. Taking a home IP sharing communication environment as another example, the host 11 may be a web server or a computer, each of the terminals 12 may be a network router, a network IP sharing switch, a wireless network base station, a computer or a handheld network device, the gateway device 13 may be a network router, a network IP sharing switch or a wireless network base station, and the network 14 connected is the Internet.

The method and system of smart detection and recovery according to the present invention can not only allow the terminal 12 to automatically detect for a change in IP address of a specific device (e.g., the host 11), but also allow the terminal 12 receiving the service to be automatically reconnected or redirected when a change in network address is detected so that duration of service interruption is shortened to the greatest extent, thereby obviating the trouble in terms of connection and possible consequent loss caused by failure of proper connection. To accomplish the detection efficiently, a method for quickly blocking packets at a bottom layer of the software architecture of the terminal 12 is proposed in the present invention to analyze the packets. In this way, change of a monitored device (e.g., the host 11) from its original IP address can be found at an early time so that reconnection or redirection is made to recover the service as early as possible and to ease the burden of the system incurred by the detection.

Figure 4:
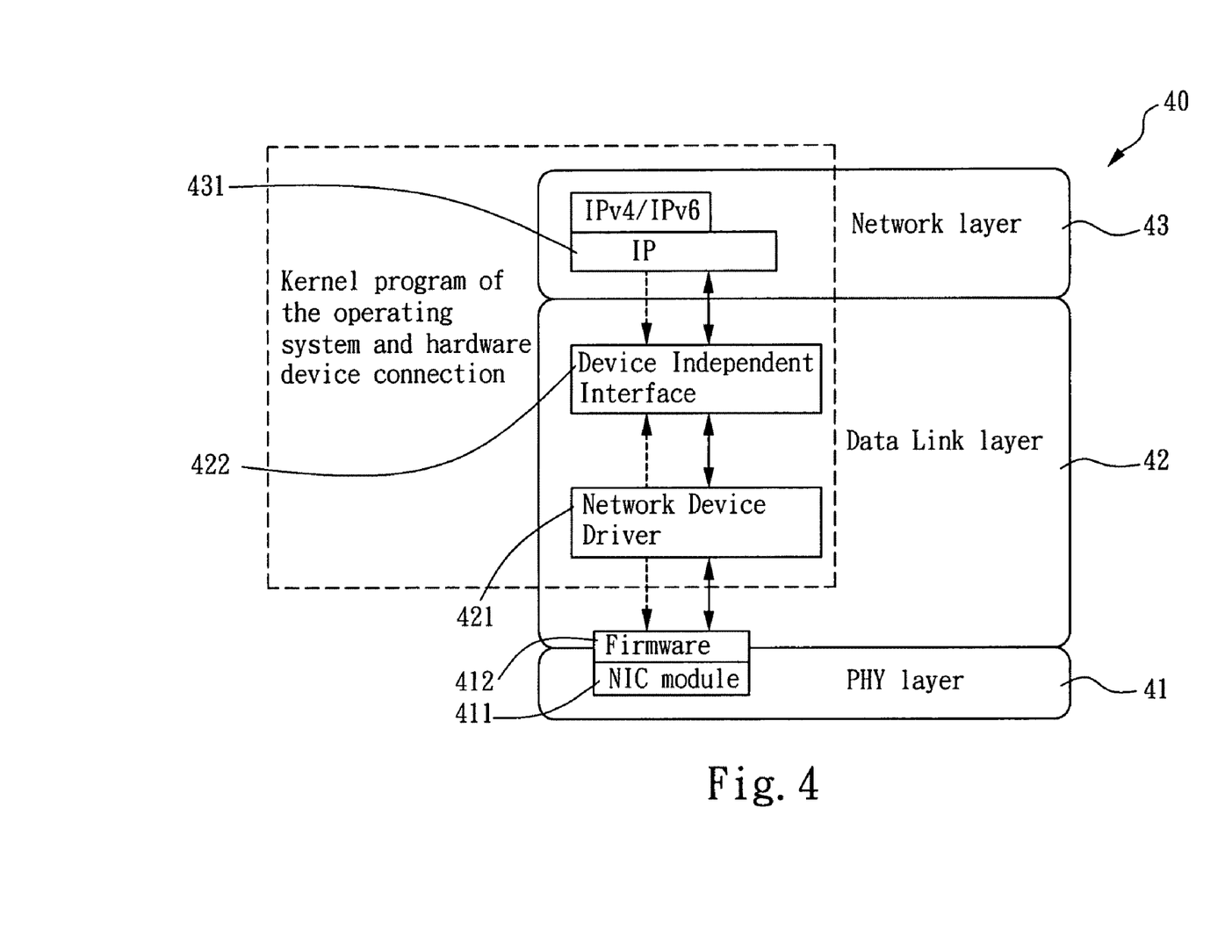
FIG. 4 is a schematic diagram of a typical network module architecture.

FIG. 4 is a schematic diagram of a typical network module architecture. Network modules of common devices with network communication functionality, including hosts and terminals, generally have an architecture similar to that of the network module 40, namely being composed of the PHY layer 41 at the bottom, the Data Link layer 42 above the PHY layer 41, and the Network layer 43 at the top. The PHY layer 41 includes therein a Network Interface Card (NIC) module 411 and a firmware 412. The Data Link layer 42 includes therein a Network Device Driver 421 and a Device Independent Interface 422. The Network layer 43 includes therein a network protocol 431, for example but not limited to, IPv4, IPv6 or the like. The network device driver 421, the device independent interface 422 and the network protocol 431 in combination substantially form a kernel program of the operating system and hardware device connection of the network module 40, for example but not limited to, Kernel® and the like.

The method and system of smart detection and recovery according to the present invention may be implemented in the firmware 412 or the network device driver 421 of the network module 40. Taking the architecture shown in FIG. 4 as an example, the method and system implemented at a lower layer (e.g., in the firmware) provide better benefits. As to how the firmware 412 and the network device driver 421 can learn a specific condition to be detected, an application such as ioctl may be used to inform the bottom layer of the condition to be detected after initiation of the method of smart detection and recovery according to the present invention, thereby launching the detecting operation.

Figure 5:
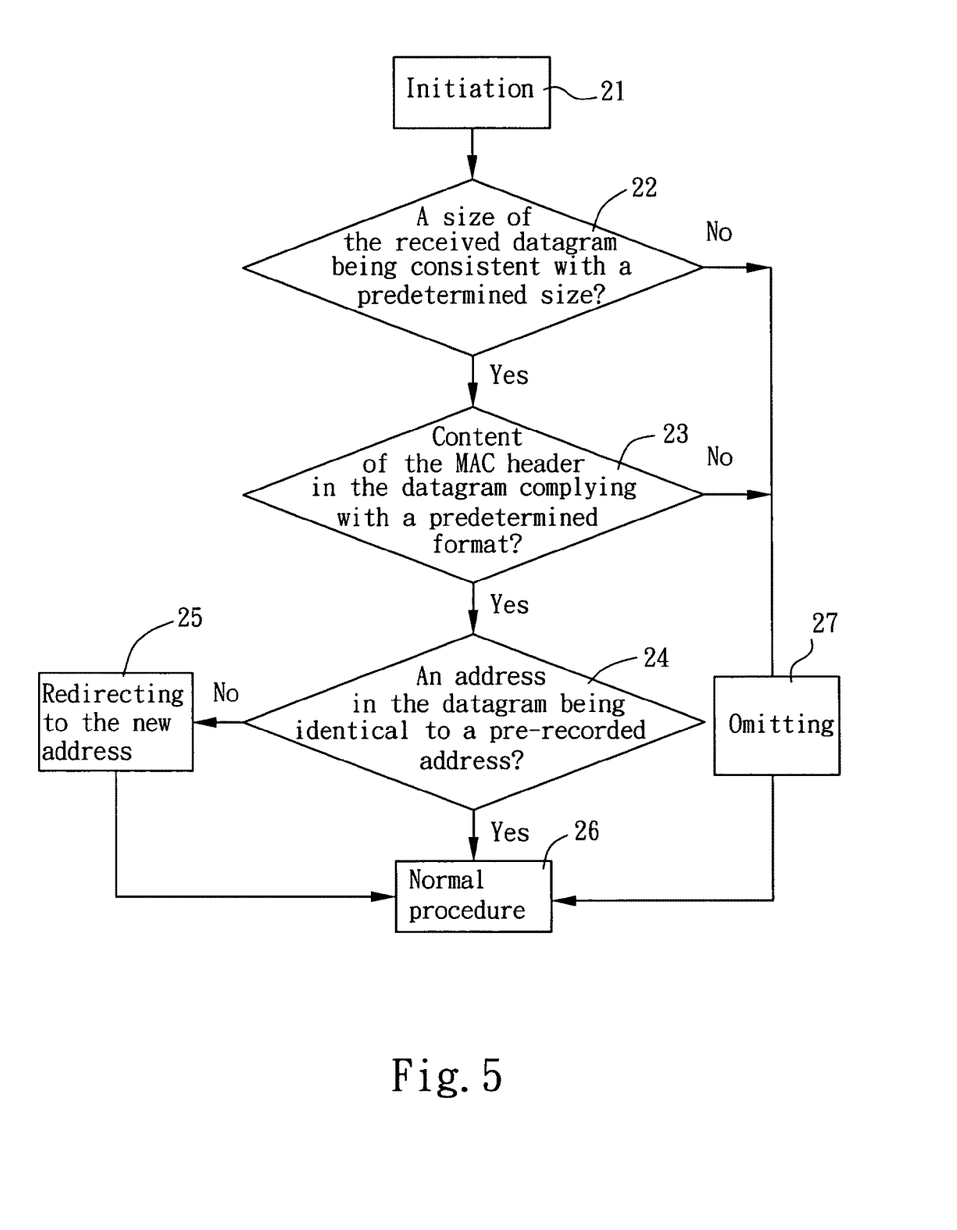
FIG. 5 is a flowchart of an embodiment of a method of smart detection and recovery according to the present invention.

Referring to FIG. 5, there is shown a flowchart of an embodiment of the method of smart detection and recovery according to the present invention. This method is implemented in a terminal to detect a status of a host, a detecting process of which is as follow.

Step (21): Initiation

Firstly, the terminal needs to establish a connection with the host (e.g., accomplish registration with the host) in advance, and retrieve from the host an IP address currently used and an MAC address currently used by the host, and store the IP address currently used and the MAC address currently used, in form of a look-up table (LUT), into a memory. Also stored in the memory of the terminal are information of hardware formats compatible with the host and information of datagram formats compatible with the host's network communication protocol. In case the host adopts the standard Address Resolution Protocol (ARP) for communication, the datagram format information includes at least one of the following: a size of the datagram, an MAC header, an ARP header, an IP header, and data. The MAC header at least further includes a Type field and a Source MAC Address field, the ARP header at least further includes an Opcode field and a Protocol Address of Sender field, and the IP header at least further includes a Next Header field and an ICMPv6 Header field.

Then, the detecting process of the method of smart detection and recovery according to the present invention is initiated to begin to receive datagram from the outside.

Step (22): Determining whether the size of the datagram received is consistent with a predetermined size; If yes, then executing step (23); otherwise, executing step (27).

Figure 6:
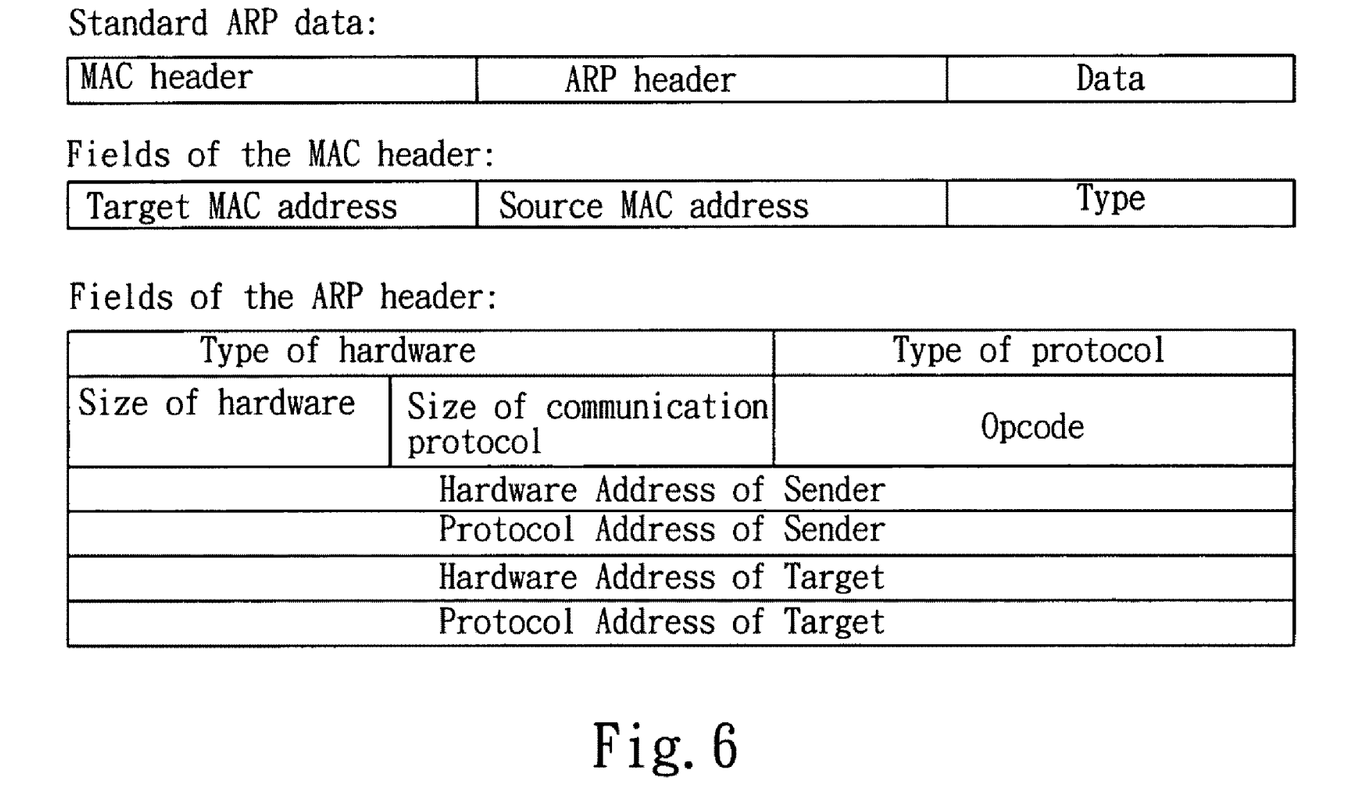
FIG. 6 illustrates a field architecture of a standard ARP datagram.
Figure 7:
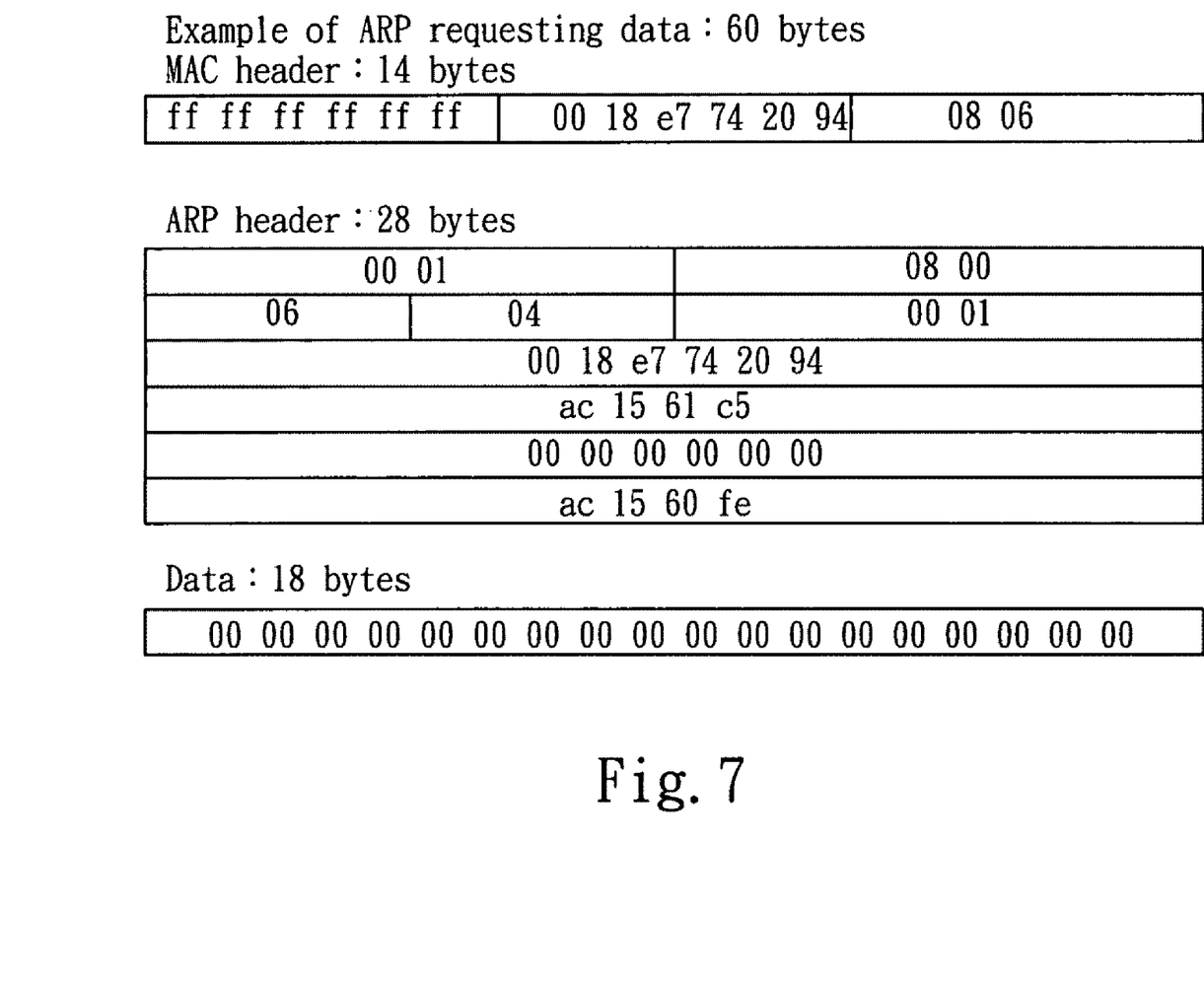
FIG. 7 illustrates examples of contents of a MAC header and an ARP header in a typical ART datagram.

Referring to FIGS. 6 and 7, an example of a field architecture of a standard Address Resolution Protocol (ARP) datagram and an example of content in the MAC header and the ARP header of a typical ARP datagram are shown therein respectively. Taking the ARP datagram shown in FIGS. 6 and 7 as an example, the predetermined size of the datagram is 60 bytes. Accordingly, if the size of the datagram received by the terminal is not 60 bytes, it means that the datagram does not comply with ARP and, of course, is not from the host, so the datagram may be omitted from further content interpretation directly. Taking an IPv6 protocol datagram as another example (i.e., when the host adopts the IPv6 protocol for communication), the predetermined size of the datagram is 78 bytes. Accordingly, if the size of the datagram received by the terminal is not 78 bytes, it means that the datagram does not comply with the IPv6 protocol and, of course, is not from the host, so the datagram may be omitted from further content interpretation directly.

Because this step only involves determining the size of the datagram, it is the most straightforward, easiest and quickest way of blocking. Accordingly, this may greatly ease the burden of the terminal in processing the datagram received, thereby resulting in reduced power consumption, a higher response speed and improved communication quality.

Step (23): Determining whether content of the MAC header included in the datagram complies with a predetermined format; If yes, then executing step (24); otherwise, executing step (27).

Taking the standard ARP datagram as an example, the Type field in the MAC header thereof has a format of 0x0806, and the Opcode field in the ARP header has a predetermined opcode format of 0x01. Hence, if content (e.g., the Type field described above) of the MAC header or the Opcode field of the ARP header included in the datagram received by the terminal does not comply with the predetermined format, it means that the datagram does not comply with the ARP and, of course, is not from the host, so the datagram may be omitted from further content interpretation directly. Because this step only involves comparing the datagram with the predetermined format, it is the most straightforward, easiest and quickest way of blocking. Accordingly, this may greatly ease the burden of the terminal in processing the datagram received, thereby resulting in reduced power consumption, a higher response speed and improved communication quality.

Likewise, taking a datagram complying with the IPv6 protocol as an example, the Type field of the MAC header has a predetermined format of 0x8dd, the Next Header field of the IP header has a predetermined header format of 0x3a, and the Type field of the ICMPv6 header has a predetermined format of 0x87. Hence, if content of any of the MAC header, the IP header or the ICMPv6 header included in the datagram received by the terminal does not comply with the predetermined format, it means that the datagram does not comply with the IPv6 protocol and, of course, is not from the host, so the datagram may be omitted from further content interpretation directly.

Step (24): Determining whether an address in the datagram is identical to a pre-recorded address; If not, then executing step (25); otherwise, executing step (26).

If the determination results of the aforesaid steps (22) and (23) are both "yes", then it means that the datagram received is in the right datagram format of the communication protocol used by the host, and then it is further determined whether the datagram is sent by the host. This step involves the following two operations. Firstly, it is determined whether an MAC address included in the datagram is just the MAC address currently used by the host. If not, it means that the datagram is not from the host, so it may be omitted from further content interpretation directly; otherwise, if the answer is "yes", it means that the datagram is from the host, and it is further determined whether an IP address included in the datagram is just the IP address currently used by the host in order to detect for a change in address of the host. If the determination result is "no", it means that the address of the host has changed and then step (25) is executed; otherwise, if the determination result is "yes", it means that the address of the host has not changed and then step (26) is executed where data in the datagram is further interpreted and processed through a normal procedure.

Taking the standard ARP datagram shown in FIGS. 6 and 7 as an example, the MAC address information included in the datagram is recorded in the "Source MAC Address" field of the MAC header, and the IP address information is recorded in the "Protocol Address of Sender" field of the ARP header. Corresponding data for comparison against the addresses included in the datagram are pre-stored in the memory as the "MAC address currently used" and the "IP address currently used" of the host.

Step (25): When the address is changed, performing redirection to the new address, and then executing step (26).

Once it is found that the IF address of the host has changed, an address altering procedure is executed in which the IP address included in the datagram is used as a new address and reconnection or redirection to the new address is made (for example but not limited to, register with the new address of the host again) to regain services provided by the host. Afterwards, the updated IP address is stored, as an IP address currently used, into the memory for subsequent comparison.

Step (26): Processing the received datagram through a normal procedure, and then returning back to step (22) to receive other datagrams.

Here, the "normal procedure" refers to the normal communication procedure in which, under normal connection conditions, communication and data transmission are made between the terminal and the host and the terminal receives services provided by the host.

Step (27): Omitting.

Once it is found that the datagram is not from the host, the method of smart detection and recovery according to the present invention may omit the datagram directly instead of continuing to determine whether content of the datagram involves a change in address. Two possibilities exist for this step, one of which is that the destination of the datagram is just the terminal and the other is that the destination of the datagram is not the terminal. This may be determined by determining whether the "Destination MAC Address" field of the MAC header or the "Protocol Address of Target" of the MAC header in the datagram is consistent with the address of the terminal itself. If the determination result is "no", then it means that the datagram is not sent to the terminal, so the terminal abandons the datagram simply. Otherwise, if the determination result is "yes", it is likely that the datagram is transmitted by other network devices (e.g., another terminal) to the terminal directly, in which case the terminal will process the datagram through the normal procedure (i.e., step (26) is executed).

Figure 8:
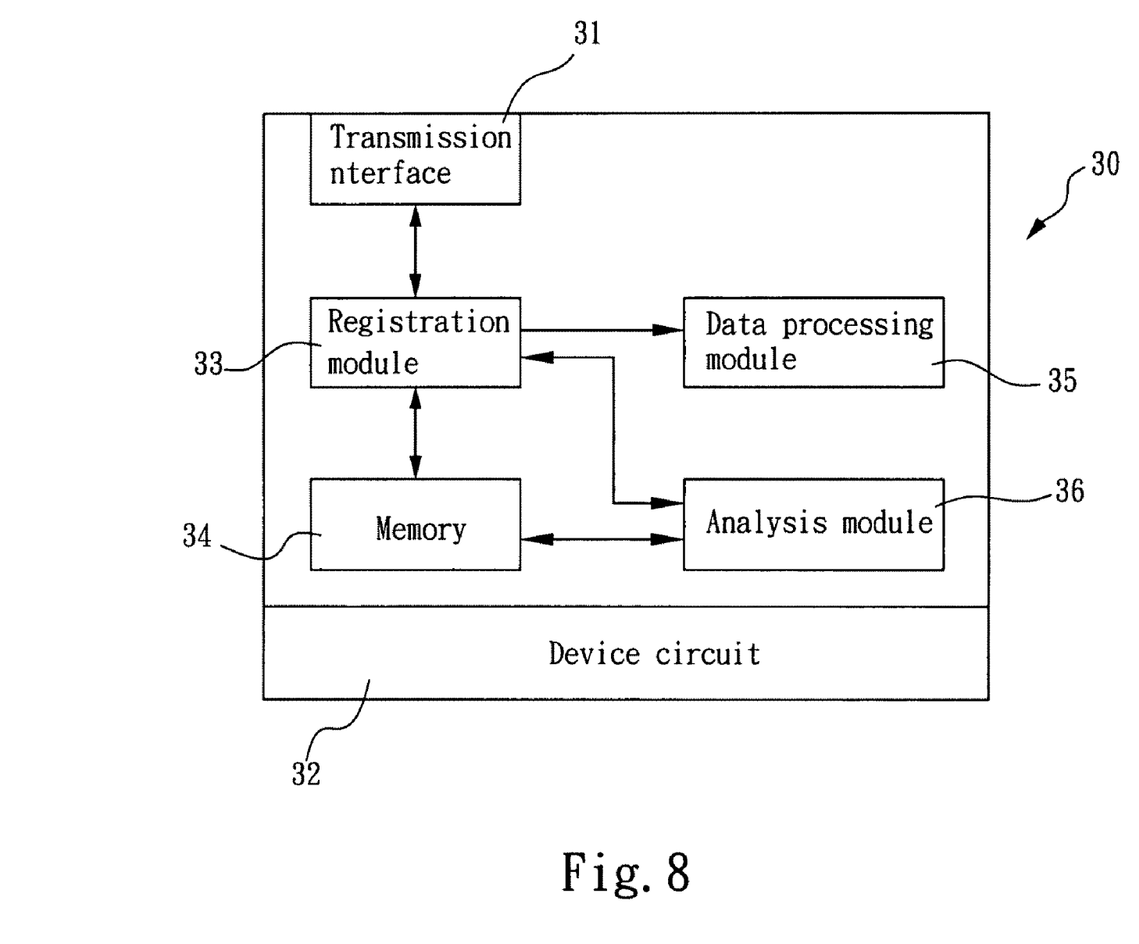
FIG. 8 is a block diagram of an embodiment of the system of smart detection and recovery according to the present invention.

Referring to FIG. 8, there is shown a block diagram of an embodiment of a system 30 of smart detection and recovery according to the present invention. The system 30 may be implemented in a terminal described above, for example but not limited to, an VoIP phone, a VoIP gateway, a network router, a network sharing switch, a wireless network base station, a computer, a handheld network device or the like. The system 30 comprises a transmission interface 31, a device circuit 32, a registration module 33, a memory 34, a data processing module 35 and an analysis module 36.

The transmission interface 31 is a hardware interface configured to connect with an external host and transmit data, for example, a network interface or the like. The device circuit 32 is configured to accomplish various operations and functions of the terminal, namely being a collective term generally referring to various internal hardware circuits necessary for operations and functions of the terminal. The registration module 33 is configured to send a connection establishment request (for example, but not limited to, registering with the host) to the host, and retrieve an IP address currently used by the host and an MAC address currently used by the host in order to receive services provided by the host. The memory 34 is at least configured to store predetermined data used for comparison during execution of the method of smart detection and recovery according to the present invention, including at least the IP address currently used and the MAC address currently used. The data processing module 35 is configured to receive at least one datagram from the outside via the transmission interface 31 and interpret data included in the datagram, especially information included in individual headers or fields of the datagram. The analysis module 36 is configured to analyze data of the datagram, which has been interpreted by the data processing module 35, against the IP address currently used and the MAC address currently used, and decide whether the registration module 33 shall send a connection establishment request again to the host according to the analysis result. For how the analysis is made, reference may be made to FIG. 5 and the related description.

Hereinafter, examples of the method of smart detection and recovery according to the present invention will be described in detail with reference to the "VoIP communication environment" and the "home IP sharing communication environment" described above.

EXAMPLE A

Taking the VoIP communication environment shown in FIG. 1 as an example, if a telephone (i.e., the terminal) and a gateway (i.e., the gateway device) are able to automatically detect that an address of a base unit (i.e., the host) has changed and re-register with the new address automatically, the interruption duration of the telephone network will be reduced to the greatest extent. This will be detailed as follows (with the telephone as an example).

When the telephone is registered with the Response Point network properly, the telephone reports the IP address and the MAC address currently used by the base unit to the bottom layer and initiates the method of smart detection and recovery according to the present invention.

After the method of smart detection and recovery according to the present invention is initiated, the telephone will consider a gratuitous ARP as a designated datagram to be detected and make an analysis thereon. The following determinations will be made on each datagram received:

(A1) determining whether the datagram received has a size of 60 bytes, and if yes, then proceeding with the process;

(A2) determining whether the Type field of the MAC header is 0x0806 and the Opcode field of the ARP header is 0x01, and if yes, then proceeding with the process;

(A3) determining whether the Source MAC Address in the MAC header is consistent with the base unit, and if yes, then proceeding with the process;

(A4) determining whether the protocol address of target is identical, and if yes, then only detecting the gratuitous ARP of this datagram, wherein, if the designated IP address in the datagram is found to be inconsistent with the pre-recorded IP address, it means that the base unit has changed its address. And then the telephone is informed that a change in address has been found and the datagram is put through a normal processing procedure; and (A5) if the process does not proceed after any of the above determinations, then processing the datagram through the normal processing procedure.

Once the telephone finds that the base unit has changed its address, it will register with the new address of the base unit anew to ensure that subsequent SIP message exchange goes on properly.

This practice allows for recovery to the original processing procedure of datagram once inconsistency is found, thereby easing burden imposed on the system by the detecting process. Besides, by use of the method of smart detection and recovery according to the present invention, the whole telephone network is able to resume normal operation within a few seconds after the base unit is reinitiated without need of any additional operations, thereby completing the recovery without being perceived by the user. As compared to conventional practices in which the incoming call cannot be connected to the destination because the user has to wait for an SIP Registration Expire time up to half an hour or re-registration can be initiated by the telephone only when failure of a session occurs, the method of the present invention can surely reduce the loss to the greatest extent.

EXAMPLE B

Taking the home IP sharing communication environment shown in FIG. 2 as an example, if a computer (i.e., the terminal) and an IP sharing switch (i.e., the gateway device or the terminal described in the present invention) are able to automatically detect that a base unit (i.e., the host) has changed its address and re-register with the new address automatically, the duration of network service interruption will be reduced to the greatest extent. The method of smart detection and recovery according to the present invention can also solve this problem.

When a group of specific port forwarding configurations is designated in the IP sharing switch (which is a terminal in this example), the IP sharing switch reports the IP address and the MAC address currently used by the designated device (e.g., the base unit) to the bottom layer and stores them in a look-up table (LUT), and initiates the method of smart detection and recovery according to the present invention.

After the method of smart detection and recovery according to the present invention is initiated, the IP sharing switch will consider a gratuitous ARP as a designated datagram to be detected and make an analysis thereon. The following determinations will be made on each datagram received:

(B1) determining whether the datagram received has a size of 60 bytes, and if yes, then proceeding with the process;

(B2) determining whether the Type field of the MAC header is 0x0806 and the Opcode field of the ARP header is 0x01, and if yes, then proceeding with the process;

(B3) determining whether the Source MAC Address in the MAC header exists in the LUT, and if yes, then proceeding with the process;

(B4) determining whether the protocol address of target is identical, and if yes, then this datagram is just the gratuitous ARP to be detected, wherein, if the designated IP address in the datagram is found to be inconsistent with the pre-recorded IP address, it means that the device monitored has changed its address and then the IP sharing switch (i.e., a terminal) is informed that a change in address has been found and the datagram is put through a normal processing procedure; and (B5) if the process does not proceed after any of the above determinations, then processing the datagram through the normal processing procedure.

EXAMPLE C

To cope with the possibility that the user may activate the function of IPv6 address, the method of smart detection and recovery according to the present invention also provides a corresponding mechanism which allows for detection of ICMPv6 Neighbor Solicitation in the IPv6 network environment by making the following determinations.

(C1) determining whether the datagram received has a size of 78 bytes, and if yes, then proceeding with the process;

(C2) determining whether the Type field of the MAC header is an IPv6 packet of 0x86dd, and if yes, then proceeding with the process;

(C3) determining whether the Next Header field designated in the IP header is an ICMPv6 packet of 0x3a, and if yes, then proceeding with the process;

(C4) determining whether the Type field in the ICMPv6 header is a Neighbor Solicitation of 0x87, and if yes, then only detecting ICMPv6 Neighbor Solicitation of this datagram, wherein, if the designated IP address in the datagram is found to be inconsistent with the pre-recorded IP address, it means that the device monitored has changed its address, and then the IP sharing switch is informed that a change in address has been found and the datagram is put through a normal processing procedure; and (C5) if the process does not proceed after any of the above determinations, then processing the datagram through the normal processing procedure.

Once the IP sharing switch (i.e., a terminal) finds that the device monitored has changed its address, the corresponding port forwarding configurations will be updated so that the device can continue to access via an external address, thereby ensuring offering of normal services.

In summary, the present invention provides an approach of smart detection of datagram, by which a designated device can be monitored. Once this device is found to have changed its address due to various reasons, recovery of the connection with this device or redirection can be accomplished within the shortest time so as to keep smooth use of the network and obviate loss incurred by failure to access the services normally. This approach eases the burden of the system incurred by the detection by utilizing features of the datagram to make an analysis quickly, so it will not impose substantial effect on the network performance within a reasonable monitoring scope. Hence, the present invention is very suitable for use in network environments where services are needed but it is impossible to ensure a fixed IP address of the service device, so as to obviate troubles and cost associated with manual servicing and surely overcome various shortcomings of the prior art.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A method of smart detection and recovery, being implemented in a terminal to detect a status of a host, wherein the terminal retrieves from the host in advance an IP address currently used and an MAC address currently used by the host, and the terminal comprising:

a transmission interface, being configured to connect with an external host and transmit data;

a device circuit, being configured to perform various operations and functions of the terminal;

a registration module, being configured to send a connection establishment request to the host via the transmission interface, and retrieve an IP address currently used by the host and an MAC address currently used by the host;

a memory, being configured to store at least the IP address currently used and the MAC address currently used;

a data processing module, being configured to receive at least one datagram from the outside via the transmission interface and interpret data included in the datagram; and an analysis module, being configured to analyze data of the datagram, which has been interpreted by the data processing module, against the IP address currently used and the MAC address currently used, and decide whether the registration module shall send the connection establishment request again to the host according to the analysis result; wherein, the method comprising the analysis module analyzes data of the datagram by the following steps:

(A) receiving a datagram;

(B) determining whether a size of the datagram is consistent with a predetermined size, and if yes, then executing step (C), and otherwise, executing step (G);

(C) determining whether an MAC header included in the datagram complies with a predetermined format, and if yes, then executing step (D), and otherwise, executing step (G);

(D) determining whether an IP address included in the datagram is identical to the IP address currently used, and if no, then executing step (E), and otherwise, executing step (F);

(E) executing an address altering procedure in which the IP address included in the datagram is used as a new address and reconnection or redirection to the new address is made;

(F) processing the received datagram through a normal procedure and returning to the step (A); and (G) omitting the datagram and returning to the step (A).

2. The method of claim 1, wherein the step (C) further comprises the following steps of:

(C1) determining whether a Type field included in the MAC header complies with a predetermined type format, and if yes, then executing the next step, and otherwise, executing the step (G); and (C2) determining whether an MAC address included in the MAC header is identical to the MAC address currently used, and if yes, then executing the step (D), and otherwise, executing the step (G).

3. The method of claim 2, wherein the method further comprises the following steps between the step (C1) and the step (C2):

(C1a) determining whether an Opcode field included in an ARP header of the datagram complies with a predetermined opcode format, and if yes, then executing the step (C2), and otherwise, executing the step (G).

4. The method of claim 2, wherein the method further comprises the following steps between the step (C1) and the step (C2):

(C1b) determining whether a Next Header field included in an IP header of the datagram complies with a predetermined header format, and if yes, then executing step (C1c), and otherwise, executing the step (G); and (C1c) determining whether a Type field included in an ICMPv6 header of the datagram complies with a predetermined ICMPv6 format, and yes, then executing the step (C2), and otherwise, executing the step (G).

5. The method of claim 1, wherein the terminal is a VoIP phone, a VoIP gateway, a network IP router, an IP sharing switch, a wireless network base station, a computer or a handheld network device.

6. The method of claim 1, wherein the host is a VoIP base unit, a web server or a computer.

7. The method of claim 1, wherein the IP address currently used and the MAC address currently used that are retrieved in advance by the terminal are stored into a memory in form of a look-up table (LUT).

8. A system of smart detection and recovery, being implemented in a terminal, comprising:

a transmission interface, being configured to connect with an external host and transmit data;

a device circuit, being configured to perform various operations and functions of the terminal;

a registration module, being configured to send a connection establishment request to the host via the transmission interface, and retrieve an IP address currently used by the host and an MAC address currently used by the host;

a memory, being configured to store at least the IP address currently used and the MAC address currently used;

a data processing module, being configured to receive at least one datagram from the outside via the transmission interface and interpret data included in the datagram; and an analysis module, being configured to analyze data of the datagram, which has been interpreted by the data processing module, against the IP address currently used and the MAC address currently used, and decide whether the registration module shall send the connection establishment request again to the host according to the analysis result; wherein, the analysis module analyzes data of the datagram by the following steps:

(A) receiving the datagram;

(B) determining whether a size of the datagram is consistent with a predetermined size, and if yes, then executing step (C), and otherwise, executing step (G);

(C) determining whether a MAC header included in the datagram complies with a predetermined format, and if yes, then executing step (D), and otherwise, executing step (G);

(D) determining whether an IP address included in the datagram is identical to the IP address currently used, and if no, then executing step (E), and otherwise, executing step (F);

(E) executing an address altering procedure in which the IP address included in the datagram is used as a new address and reconnection or redirection to the new address is made;

(F) processing the received datagram through a normal procedure and returning to the step (A); and (G) omitting the datagram and returning to the step (A).

9. The system of claim 8, wherein:

the terminal is a VoIP phone, a VoIP gateway, a network IP router, an IP sharing switch, a wireless network base station, a computer or a handheld network device;

the host is a VoIP base unit, a web server or a computer; and, the IP address currently used and the MAC address currently used that are retrieved in advance by the terminal are stored into a memory in form of a look-up table (LUT).

10. The system of claim 8, wherein the step (C) further comprises the following steps of:

(C1) determining whether a Type field included in the MAC header complies with a predetermined type format, and if yes, then executing the next step, and otherwise, executing the step (G); and (C2) determining whether an MAC address included in the MAC header is identical to the MAC address currently used, and if yes, then executing the step (D), and otherwise, executing the step (G).

11. The system of claim 10, wherein the step (C) further comprises the following steps between the step (C1) and the step (C2):

(C1a) determining whether an Opcode field included in an ARP header of the datagram complies with a predetermined opcode format, and if yes, then executing the step (C2), and otherwise, executing the step (G).

12. The method of claim 10, wherein the step (C) further comprises the following steps between the step (C1) and the step (C2):
- (C1b) determining whether a Next Header field included in an IP header of the datagram complies with a predetermined header format, and if yes, then executing step (C1c), and otherwise, executing the step (G); and
- (C1c) determining whether a Type field included in an ICMPv6 header of the datagram complies with a predetermined ICMPv6 format, and yes, then executing the step (C2), and otherwise, executing the step (G).

13. A method of smart detection and recovery, being implemented in a terminal to detect a status of a host, wherein the terminal retrieves from the host in advance an IP address currently used and an MAC address currently used by the host, and the terminal comprising:
- a transmission interface, being configured to connect with an external host and transmit data;
- a device circuit, being configured to perform various operations and functions of the terminal;
- a registration module, being configured to send a connection establishment request to the host via the transmission interface, and retrieve an IP address currently used by the host and an MAC address currently used by the host;
- a memory, being configured to store at least the IP address currently used and the MAC address currently used;
- a data processing module, being configured to receive at least one datagram from the outside via the transmission interface and interpret data included in the datagram; and
- an analysis module, being configured to analyze data of the datagram, which has been interpreted by the data processing module, against the IP address currently used and the MAC address currently used, and decide whether the registration module shall send the connection establishment request again to the host according to the analysis result; wherein, the method comprising the analysis module analyzes data of the datagram by the following steps:
  - (a) receiving a datagram which at least contains the following information: datagram format information, MAC address information and IP address information;
  - (b) determining whether the datagram format information complies with a predetermined datagram format, and if yes, then executing step (c), and otherwise, executing step (g);
  - (c) determining whether the MAC address information included in the datagram is identical to the MAC address currently used, and if yes, then executing step (d), and otherwise, executing step (g);
  - (d) determining whether the IP address included in the datagram is identical to the IP address currently used, and if yes, then executing step (e), and otherwise, executing step (f);
  - (e) executing an address altering procedure in which the IP address included in the datagram is used as a new address and reconnection or redirection to the new address is made;
  - (f) processing the received datagram through a normal procedure and returning to the step (a); and
  - (g) omitting the datagram and returning to the step (a).

14. The method of claim 13, wherein the datagram format information at least includes a size of the datagram and an MAC header, and the step (b) further comprises the following steps of:
- (b1) determining whether the size of the datagram is consistent with a predetermined size, and if yes, then executing step (b2), and otherwise, executing the step (g); and
- (b2) determining whether the MAC header of the datagram complies with a predetermined format, and if yes, then executing the next step, and otherwise, executing the step (g).

15. The method of claim 14, wherein the MAC header at least further includes a Type field, and the method further comprises the following steps after the step (b2):
- (b3) determining whether the Type field included in the MAC header complies with a predetermined Type format, and if yes, then executing the step (c), and otherwise, executing the step (g).

16. The method of claim 15, wherein the datagram format information further comprises an ARP header, and the step (b3) further comprises the following determination operation: determining whether an Opcode field included in the ARP header of the datagram complies with a predetermined Opcode format, and if yes, then executing the step (c), and otherwise, executing the step (g).

17. The method of claim 14, wherein the method further comprises the following steps after the step (b2):
- (b2a) determining whether a Next Header field included in an IP header of the datagram complies with a predetermined header format, and if yes, then executing step (b2b), and otherwise, executing the step (g); and
- (b2b) determining whether a Type field included in an ICMPv6 header of the datagram complies with a predetermined ICMPv6 format, and yes, then executing the step (c), and otherwise, executing the step (g).

18. The method of claim 13, wherein the terminal is a VoIP phone, a VoIP gateway, a network IP router, an IP sharing switch, a wireless network base station, a computer or a handheld network device.

19. The method of claim 13, wherein the host is a VoIP base unit, a web server or a computer.

20. The method of claim 13, wherein the IP address currently used and the MAC address currently used that are retrieved in advance by the terminal are stored into a memory in form of a look-up table (LUT).

* * * * *